United States Patent
Kawaguchi et al.

(10) Patent No.: US 7,383,717 B2
(45) Date of Patent: Jun. 10, 2008

(54) FORCE SENSOR ABNORMALITY DETECTION SYSTEM FOR LEGGED MOBILE ROBOT

(75) Inventors: Yuichiro Kawaguchi, Wako (JP); Takashi Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 11/226,367

(22) Filed: Sep. 15, 2005

(65) Prior Publication Data

US 2006/0059975 A1   Mar. 23, 2006

(30) Foreign Application Priority Data

Sep. 17, 2004   (JP)   ............... 2004-271615

(51) Int. Cl.
  *G01L 25/00*   (2006.01)
  *B25J 19/00*   (2006.01)
(52) U.S. Cl. ........................ 73/1.15; 73/1.13
(58) Field of Classification Search ................. 73/1.15, 73/1.13; 702/116; 700/260, 245; 901/1, 901/46; 318/568.24, 568.12
See application file for complete search history.

(56) References Cited

U.S. PATENT DOCUMENTS

| | | | |
|---|---|---|---|
| 4,620,436 A * | 11/1986 | Hirabayashi et al. | ......... 73/1.15 |
| 6,064,167 A * | 5/2000 | Takenaka et al. | ....... 318/568.12 |
| 6,382,012 B2 * | 5/2002 | Hara et al. | .................... 73/1.15 |
| 6,438,454 B1 * | 8/2002 | Kuroki | ...................... 700/245 |
| 2002/0120361 A1 | 8/2002 | Kuroki et al. | ............. 700/245 |
| 2006/0055358 A1 * | 3/2006 | Ogawa et al. | ......... 318/568.24 |

FOREIGN PATENT DOCUMENTS

| | | | | |
|---|---|---|---|---|
| DE | 19960482 A1 * | 6/2001 | | |
| EP | 1 475 193 | 11/2004 | | |
| EP | 1 598 156 | 11/2005 | | |
| JP | 63003235 A * | 1/1988 | ................. | 73/1.15 |
| JP | 05-337849 | 12/1993 | | |
| JP | 2002144260 A * | 5/2002 | | |
| JP | 2003-211379 | 7/2003 | | |

\* cited by examiner

*Primary Examiner*—Thomas P. Noland
(74) *Attorney, Agent, or Firm*—Squire, Sanders & Dempsey L.L.P.

(57) ABSTRACT

In a force sensor abnormality detection system for a legged mobile robot having a force sensor installed between a foot and each leg and producing an output indicative of floor reaction force acting from a floor on which the foot contacts, the robot is controlled to to perform a walking-in-place motion when the robot is powered on, it is discriminated whether the output of the force sensor during the walk-in-place motion are within a predetermined range, and abnormality of the sensor is detected based on a result of the discrimination, thereby enabling detection of force sensor abnormality with high accuracy in a legged mobile robot whose feet are equipped with force sensors for detecting floor reaction forces.

14 Claims, 9 Drawing Sheets

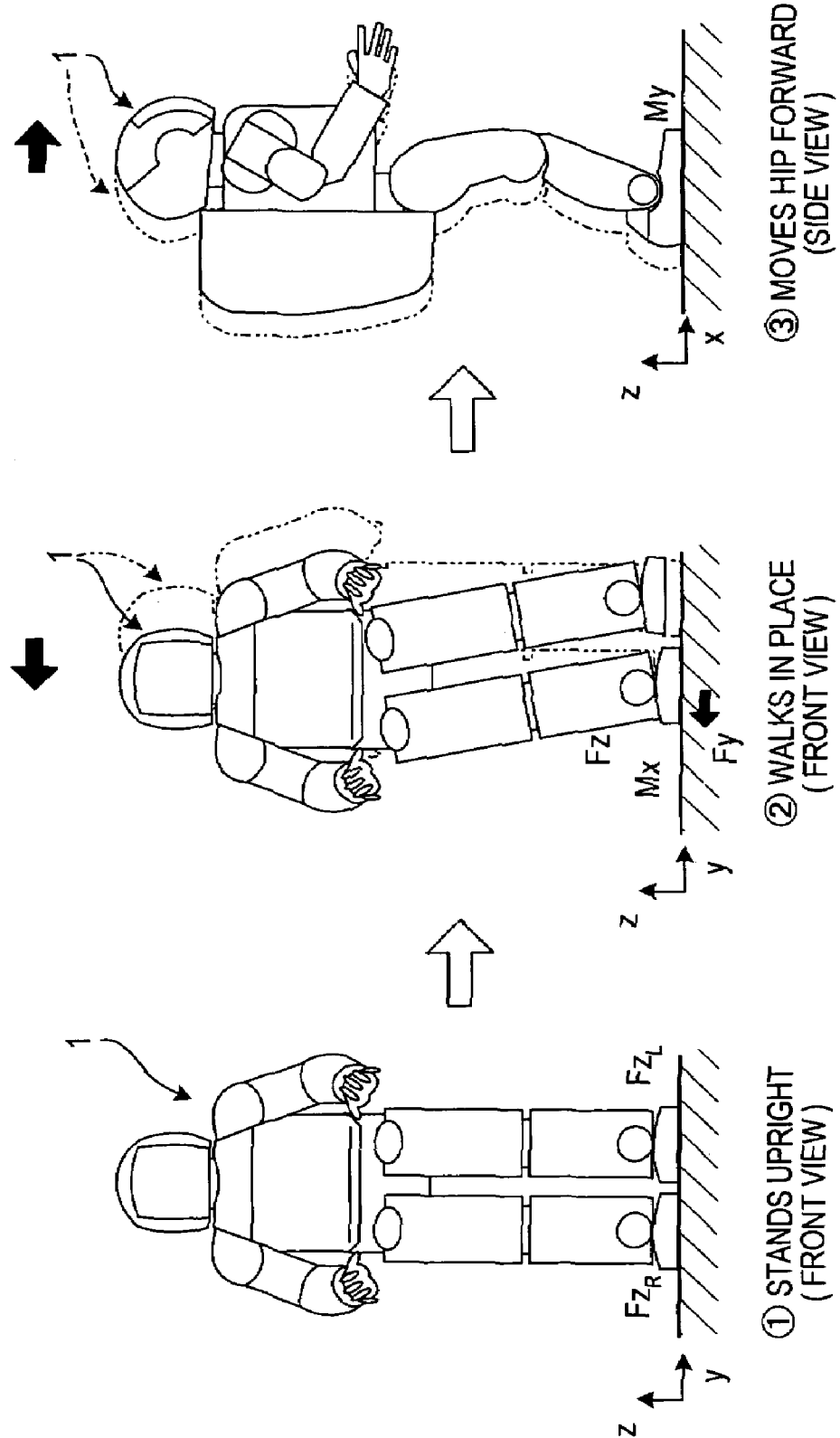

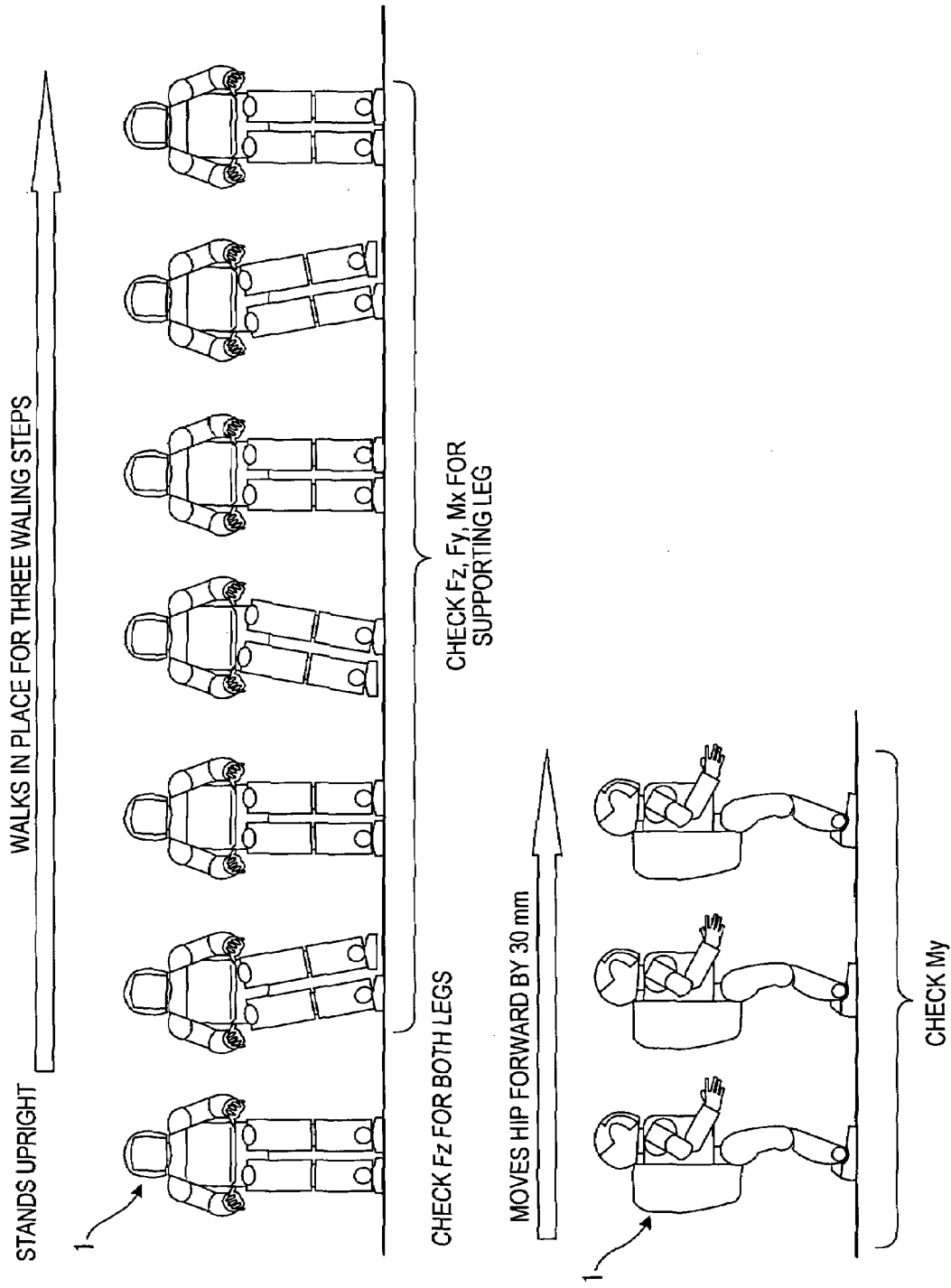

FORCE SENSOR ABNORMALITY DETECTION SYSTEM FOR LEGGED MOBILE ROBOT

BACKGROUND OF THE INVENTION

1. Field of the Invention

This invention relates to a force sensor abnormality detection system for a legged mobile robot.

2. Description of the Related Art

A legged mobile robot is equipped with various sensors, including force sensors for detecting floor reaction forces, and robot motion is controlled based on the outputs of the sensors. Detection of whether or not the sensors are abnormal or faulty is therefore required. The prior art in this regard includes Japanese Laid-Open Patent Application No. 2003-211379 (e.g., paragraph 0072) which carries out detection of various errors (abnormalities) in a robot, and as one aspect of the detection, checks for error (abnormality) by determining whether the outputs of force sensors, specifically six-axis force sensors, are within the predetermined ranges.

The floor reaction forces acting on a legged mobile robot are indispensable parameters for controlling robot motion. Abnormality of the force sensors that detect these forces therefore needs to be appropriately detected. The prior art reference is limited to detecting sensor abnormality solely by determining whether sensor outputs are within the predetermined ranges. This is not altogether satisfactory from the viewpoint of detection accuracy because a sensor may be erroneously found not to be abnormal when a sensor output just happens to be passing through the predetermined range at the time of the determination.

SUMMARY OF THE INVENTION

An object of this invention is therefore to overcome the foregoing drawback by providing a force sensor abnormality detection system for a legged mobile robot that enables detection of force sensor abnormality with high accuracy in a legged mobile robot whose feet are equipped with force sensors for detecting floor reaction forces.

In order to achieve the object, this invention provides a system for detecting force sensor abnormality for a legged mobile robot having a body, a plurality of legs each connected to the body, a foot connected to a distal end of each leg, and a force sensor installed between the foot and the leg and producing an output indicative of floor reaction force acting from a floor on which the foot contacts, comprising: a robot motion controller controlling motion of the robot to perform a walking-in-place motion when the robot is powered on; a sensor output discriminator discriminating whether the output of the force sensor during the walk-in-place motion are within a predetermined range; and a sensor abnormality detector detecting abnormality of the sensor based on a result of the discrimination.

BRIEF DESCRIPTION OF THE DRAWINGS

The above and other objects and advantages of the invention will be more apparent from the following description and drawings in which:

FIG. 8 is an explanatory view showing three types of operational control of the robot over time in sensor check (abnormality detection) in the flowchart of FIG. 6; and FIG. 9 is an explanatory view showing the three types of operational control in greater detail.

DETAILED DESCRIPTION OF THE PREFERRED EMBODIMENT

A force sensor abnormality detection system for a legged mobile robot according to an embodiment of this invention will be explained with reference to the attached drawings in the following.

Figure 1:
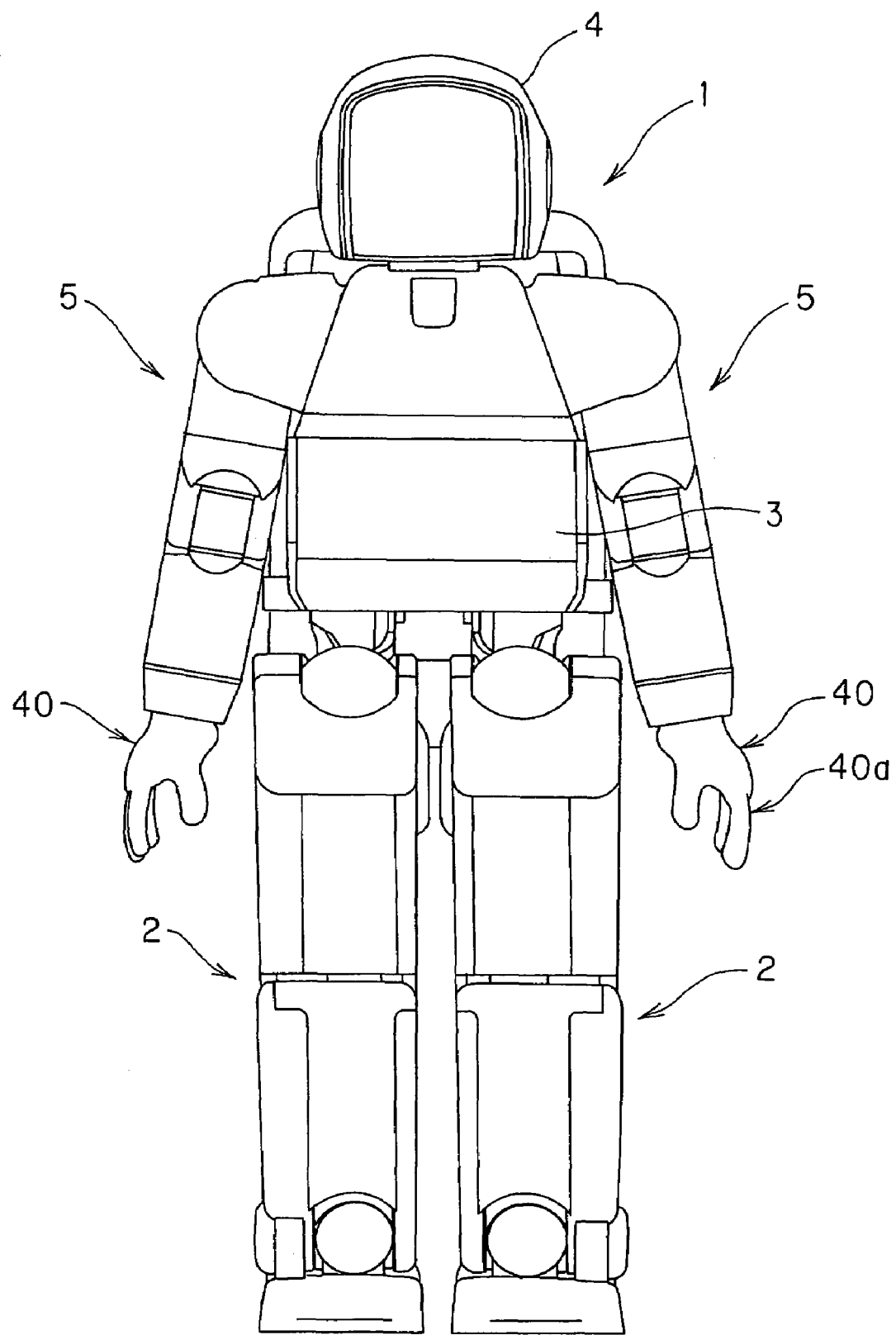
FIG. 1 is a front view of a legged mobile robot according to an embodiment of this invention.
Figure 2:
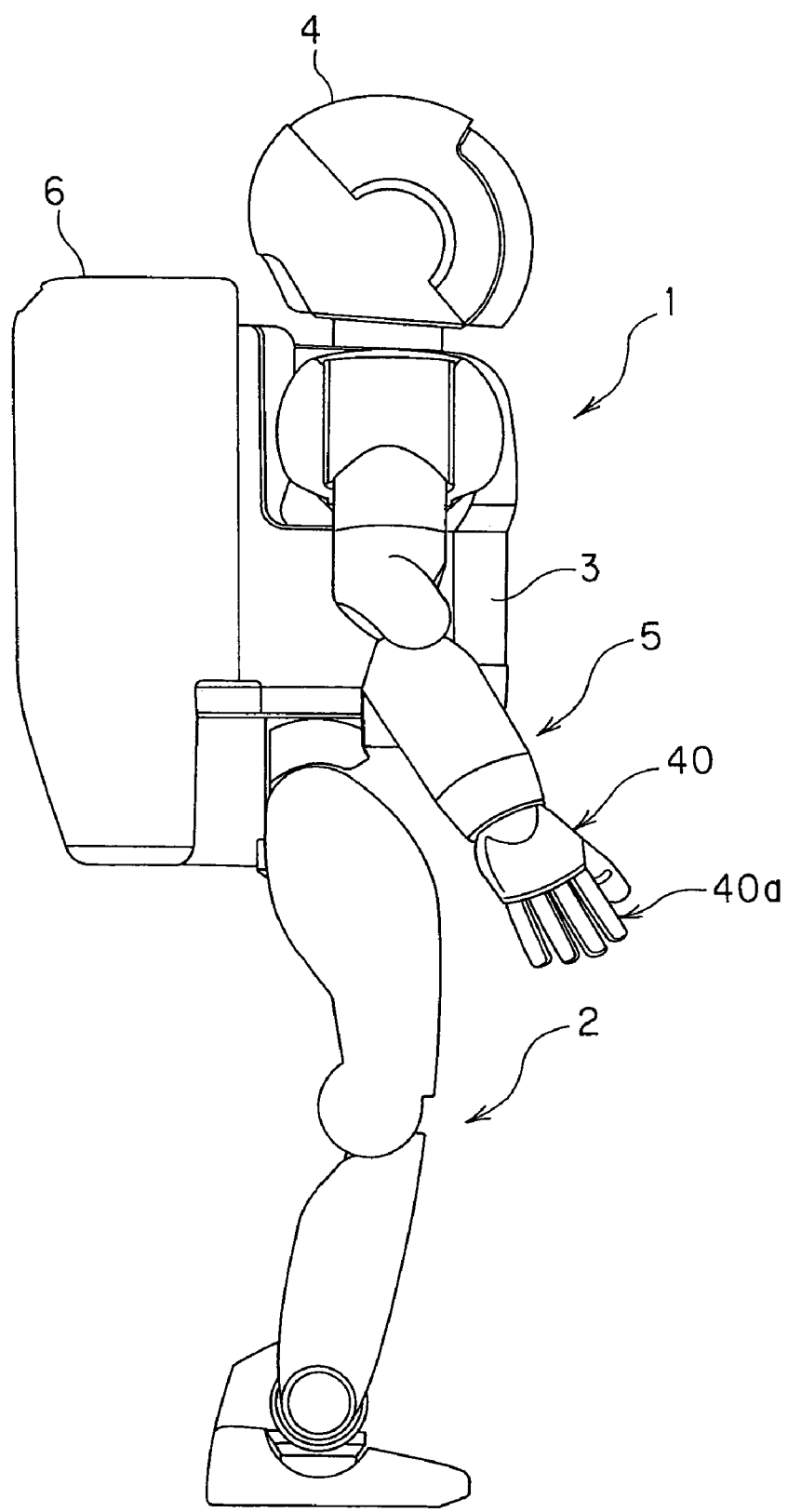
FIG. 2 is a side view of the robot of FIG. 1.

FIG. 1 is a front view of a legged mobile robot for which a force sensor abnormality detection system according to a first embodiment of this invention is applied, and FIG. 2 is a side view thereof. A biped humanoid robot is taken here as an example of a legged mobile robot.

As shown in FIG. 1, the legged mobile robot (hereinafter called simply "robot") 1 is equipped with a plurality of, more specifically two legs (leg linkages) 2 and a body (main unit) 3 above the legs 2. A head 4 is formed above the body 3 and two arms (arm linkages) 5 are connected one to either side of the body 3. As shown in FIG. 2, a housing unit 6 is mounted on the back of the body 3 that accommodates therein, an electronic control unit (explained later), a battery, etc. The robot 1 shown in FIGS. 1 and 2 is equipped with covers for protecting its internal structures.

Figure 3:
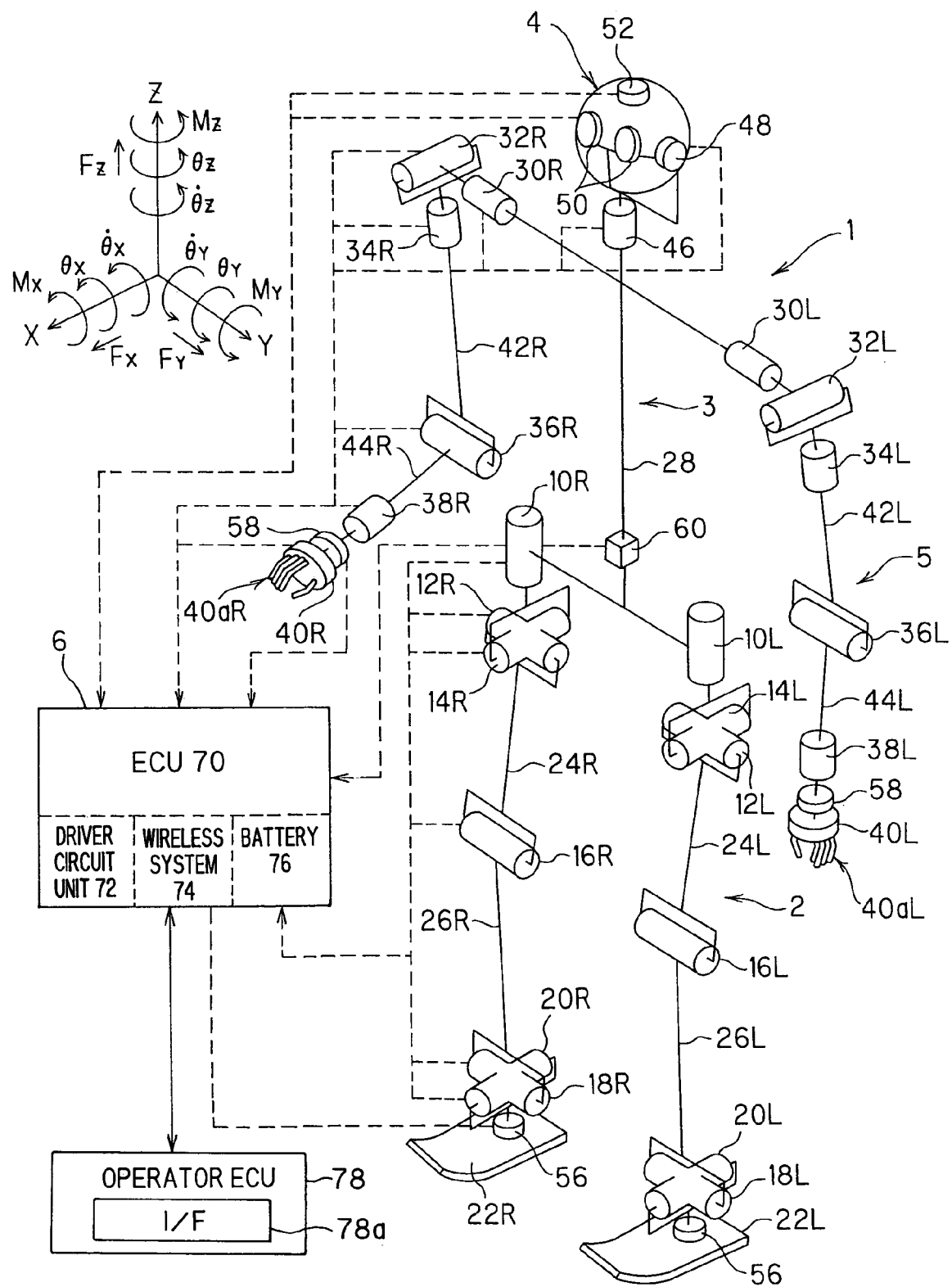
FIG. 3 is an explanatory diagram showing a skeletonized view of the robot of FIG. 1.

FIG. 3 is an explanatory diagram showing a skeletonized view of the robot 1. The internal structures of the robot 1 will be explained with reference to this drawing, with primary focus on the joints. As illustrated, the legs 2 and arms 5 on either the left or right of the robot I are equipped with six joints driven by eleven electric motors.

Specifically, the robot I is equipped at its hip (crotch) joints with electric motors 10R, 10L (R and L indicating the right and left sides; hereinafter the same) that drive joints for swinging or swiveling the legs 2 around a vertical axis (the Z axis or vertical axis), electric motors 12R, 12L that drive joints for swiveling or swinging the legs 2 in the pitch (advance) direction (around the Y axis), and 14R, 14L that drive joints for rotating the legs 2 in the roll (lateral) direction (around the X axis), is equipped at its knees with electric motors 16R, 16L that drive knee joints for rotating the lower portions of the legs 2 in the pitch direction (around the Y axis), and is equipped at its ankles with electric motors 18R, 18L that drive ankle (foot) joints for rotating the distal ends of the legs 2 in the pitch direction (around the Y axis) and electric motors 20R, 20L that drive the ankle joints for rotating them in the roll direction (around the X axis).

As set out in the foregoing, the joints are indicated in FIG. 3 by the axes of rotation of the electric motors that drive the joints or the axes of rotation of transmitting elements (pulleys, etc.) that transmits the power of the electric motors. Feet 22R, 22L are connected or attached to the distal ends of the legs 2.

In this manner, the electric motors 10R(L), 12R(L) and 14R(L) are disposed at the hip joints of the legs 2 with their axes of rotation oriented orthogonally, and the electric motors 18R(L) and 20R(L) are disposed at the ankle joints with their axes of rotation oriented orthogonally. The hip joints and knee joints are connected by thigh links 24R(L) and the knee joints and foot joints are connected by shank links 26R(L).

The legs 2 are connected through the hip joints to the body 3, which is represented in FIG. 3 simply by a body link 28. The arms 5 are connected to the body 3, as set out above.

The arms 5 are configured similarly to the legs 2. Specifically, the robot 1 is equipped at its shoulder joints with electric motors 30R, 30L that drive joints for rotating the arms 5 in the pitch direction and electric motors 32R, 32L that drive joints for rotating them in the roll direction, is equipped with electric motors 34R, 34L that drive joints for swiveling the free ends of the arms 5, is equipped at its elbow joints with electric motors 36R, 36L that drive the elbow joints for swiveling parts distal thereof, and is equipped at its wrist joints at the distal ends of the arms 5 with electric motors 38R, 38L that drive the wrist joints for swiveling the distal ends. Hands (end effectors) 40R, 40L are attached to the distal ends of the wrist joints.

The electric motors 30R(L), 32R(L) and 34R(L) are disposed at the shoulder joints of the arms 5 with their axes of rotation oriented orthogonally. The shoulder joints and elbow joints are connected by upper arm links 42R(L) and the elbow joints and wrist joints are connected by forearm links 44R(L). Each hand 40R, 40L is equipped with a mechanism that drives five fingers 40a such that the robot 1 grasps an object by fingers 40a or does other works.

The head 4 is connected to the body 3 through an electric motor 46 (that constitutes a neck joint) for rotating the head 4 around the vertical axis and a head nod mechanism 48 that rotates the head 4 around an axis perpendicular thereto. As shown in FIG. 3, the interior of the head 4 has mounted therein two CCD cameras 50 that take and produce outputs indicative of images, and a voice input/output device 52 comprising a receiver and a microphone. The images are processed in an image recognition system including an image processor (neither shown).

Owing to the foregoing configuration, the legs 2 are each provided with 6 joints constituted of a total of 12 degrees of freedom for the left and right legs, so that during locomotion the legs as a whole can be imparted with desired movements by driving the 6 joints to appropriate angles to enable desired walking in three-dimensional space. Further, the arms 5 are each provided with 5 joints constituted of a total of 10 degrees of freedom for the left and right arms, so that desired works or tasks can be carried out by driving these 5 joints to appropriate angles. In addition, the head 4 is provided with the joint and the head nod mechanism 48 constituted of two 2 degrees of freedom, so that the head 4 can be faced in a desired direction by driving these to appropriate angles.

Each of the electric motors 10R, 10L and the like is provided with a rotary encoder that produces an output or signal corresponding to at least one among the angle, angular velocity and angular acceleration of the associated joint produced by the rotation of the rotary shaft of the electric motor. Specifically, the electric motors 10R, 10L and the like comprise DC servo motors.

A conventional six-axis force sensor (hereinafter referred to "force sensor") 56 is attached to each foot 22R(L) and produces outputs or signals representing, of the external forces acting on the robot, the floor reaction force components Fx, Fy and Fz of three directions and the moment components Mx, My and Mz of three directions acting on the robot 1 from the surface of contact. The force sensor 56 comprises coupled two flange portions each transmitting load acting thereon and strain gauges affixed thereto, and is configured to calculate and output the force and moment components acting on a sensor reference point based on outputs from the strain gauges.

A similar force sensor (six-axis force sensor) 58 is attached to a position between each of the wrist joints and hands 40 and produces outputs or signals representing the external forces acting on the robot other than the floor reaction force, specifically, the external force (object reaction force) components Fx, Fy and Fz of three directions and the moment components Mx, My and Mz of three directions acting on the hands 40 from the object.

An inclination sensor 60 is installed on the body 3 and produces an output or signal representing at least one of the inclination (tilt angle) relative to the vertical axis and the angular velocity thereof, i.e., representing at least one quantity of state such as the inclination (posture) of the body 3 of the robot 1.

The outputs of the force sensor 56, etc., are sent to the electronic control unit (now assigned with reference numeral 70; hereinafter referred to as "ECU") stored in the housing unit 6 (in the figure, the input/output is shown only for the right side of the robot 1 for ease of illustration). The ECU 70 comprises a microcomputer having a CPU, a memory and an input/output interface and the like. In the housing unit 6, in addition to the ECU 70, a driver circuit unit 72 for the electric motors 10R(L), etc., a wireless system 74 and the battery (now assigned with reference numeral 76).

As shown at the lower part of FIG. 3, there is provided an operator's control unit (hereinafter called "operator ECU") 78 similarly comprising a microcomputer and having an input/output interface (I/F) 78a that allows the operator to input commands to control the operation of the robot 1. The operator ECU 78 is connected to the ECU 70 through the wireless system 74 to communicate with each other, and any command such as an emergency robot stop command inputted through the interface 78a is sent to the ECU 70 through the wireless system 74.

Figure 4:
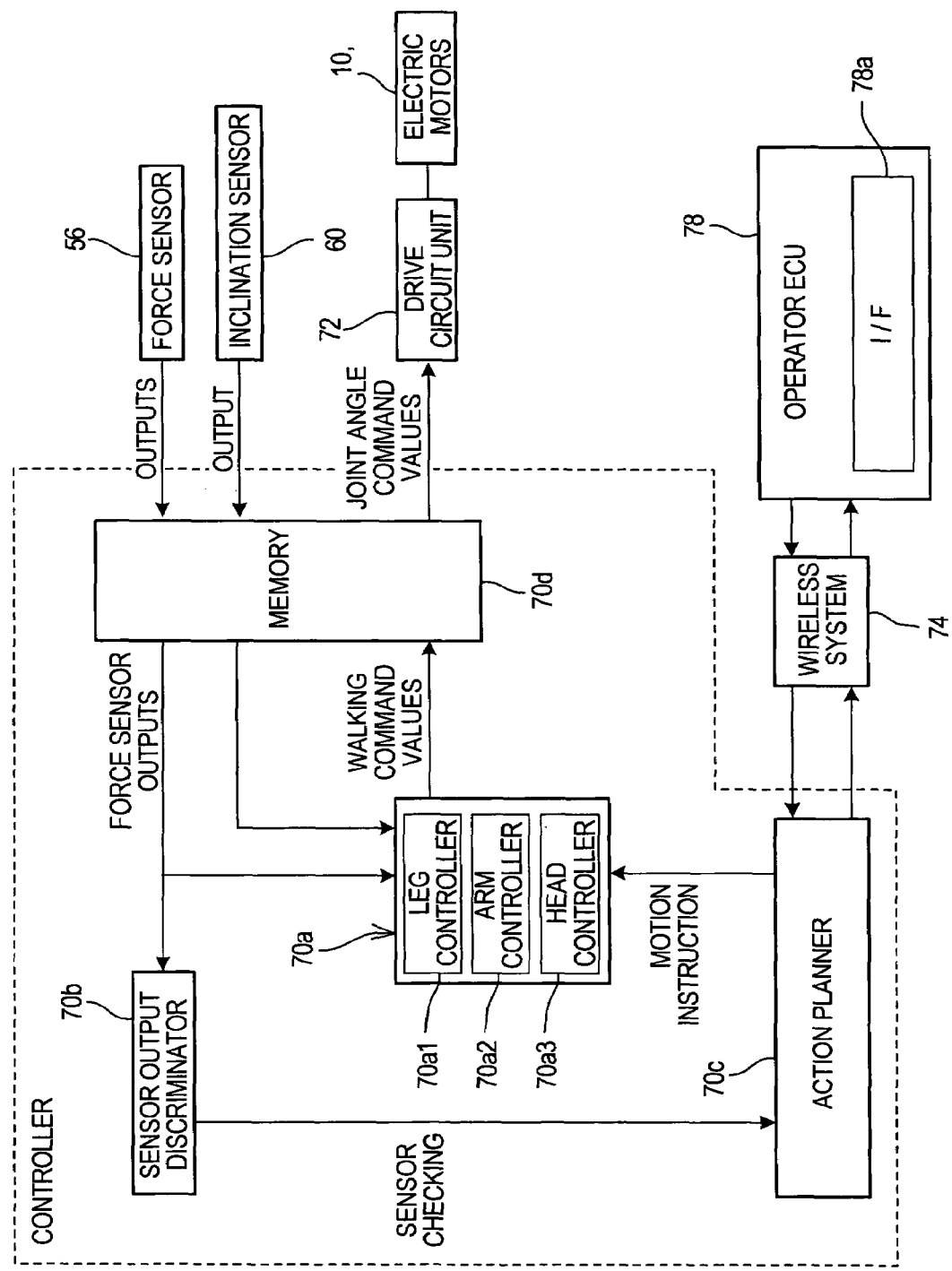
FIG. 4 is a block diagram functionally illustrating the configuration of an ECU.

FIG. 4 is a block diagram functionally illustrating the configuration of the ECU 70, specifically the operation performed by the CPU thereof.

Figure 5:
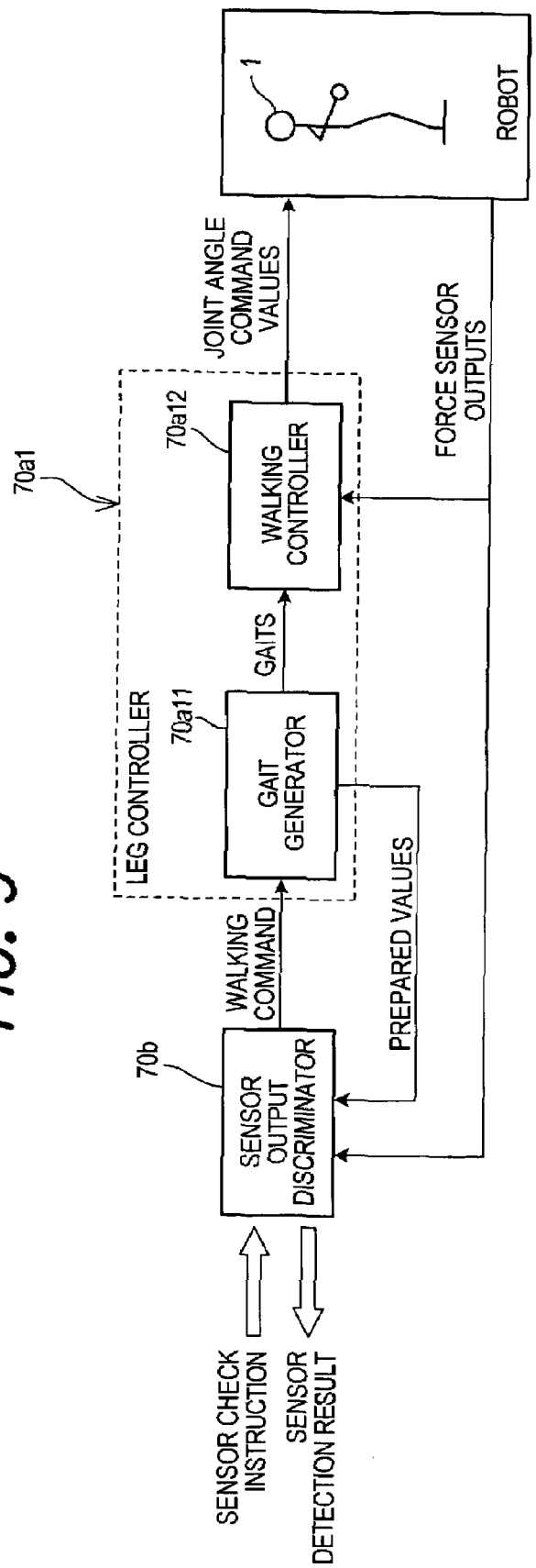
FIG. 5 is a block diagram showing the configuration of a leg controller etc. shown in FIG. 4 in further detail.

As shown in the drawing, the ECU 70 comprises a controller 70a, a sensor output discriminator 70b, an action planner 70c and a memory 70d. The controller 70a is made up of a leg controller 70a1, an arm controller 70a2 and a head controller 70a3. FIG. 5 is a block diagram showing the configuration of the leg controller 70a1 and sensor output discriminator 70b in further detail. As shown in FIG. 5, the leg controller 70a1 is equipped with a gait generator 70a11 and a walking controller 70a12.

The operation of the controller 70a will be explained with reference to FIGS. 4 and 5, focusing particularly on the leg controller 70a1. Based on gait parameters generated and stored in the memory 70d beforehand, the gait generator 70a11 in the leg controller 70a1 generates gaits successively in response to sensor outputs sent from the force sensors 56 and inclination sensor 60 and also once stored in the memory 70d, and stores the generated gaits in the memory 70d.

The walking controller 70a12 reads the stored gaits, determines the joint angle command values for the individual joints, and operates the motor 10 and other motors through the drive circuit unit 72 so as to decrease error or deviation between the joint angles detected from the outputs of the rotary encoders and the determined joint angles.

The arm controller 70a2 and head controller 70a3 also calculate joint angle command values based on the generated gaits and the outputs of the force sensors 56 and other sensors, and operate the motor 30 and other associated motors through the drive circuit unit 72. Further, the arm controller 70a2 controls the motion of the arms 5 in accordance with the task to be performed, and the head controller 70a3 controls the operation of the motor 46 and/or the head nod mechanism 48 in accordance with instructions from the image recognition system.

The gait parameters include motion parameters composed of positions and postures (orientations) of the body 3 and feet 22 and floor reaction force parameters defined by the ZMP (Zero Moment Point) concept. "Position" is indicated by X, Y and Z coordinates and "posture" by angles relative to X, Y and Z axes. So "inclination" is also one of the posture parameters.

The ZMP means the point of action on the floor where the sum of the horizontal components of the moments of the resultant forces of the inertial forces produced by movement of the robot 1 and gravitational forces is zero. Each gait is made up of the motion trajectory (locus) and the floor reaction force trajectory (locus) during one walking step (from the initial state of the two-leg support period to the terminal state of the one-leg support period), and walking is described by a series or group of gaits each defining a single walking step.

Since the gait parameters and generated gaits and the like are explained in detail in the assignee's earlier Japanese Laid-Open Patent Application No. Hei 5(1993)-337849, further explanation is omitted here.

The distinctive feature of this embodiment concerns detection of abnormality of the force sensors 56. An explanation of this feature follows.

When the robot 1 is powered on (started up), the sensor output discriminator 70b controls the motion of the robot 1 so as to perform a walk-in-place (stepping) motion, determines whether the outputs of the force sensors 56 are within the predetermined ranges at that time, and discriminates abnormality of the force sensors 56 from the results of the determination.

When a force sensor 56 is found to be abnormal, the action planner 70c terminates walking of the robot 1 and outputs the detection result to the operator ECU 78 through the wireless system 74 so as to notify it to the operator. As a result, the operator is made aware of the abnormality.

Figure 6:
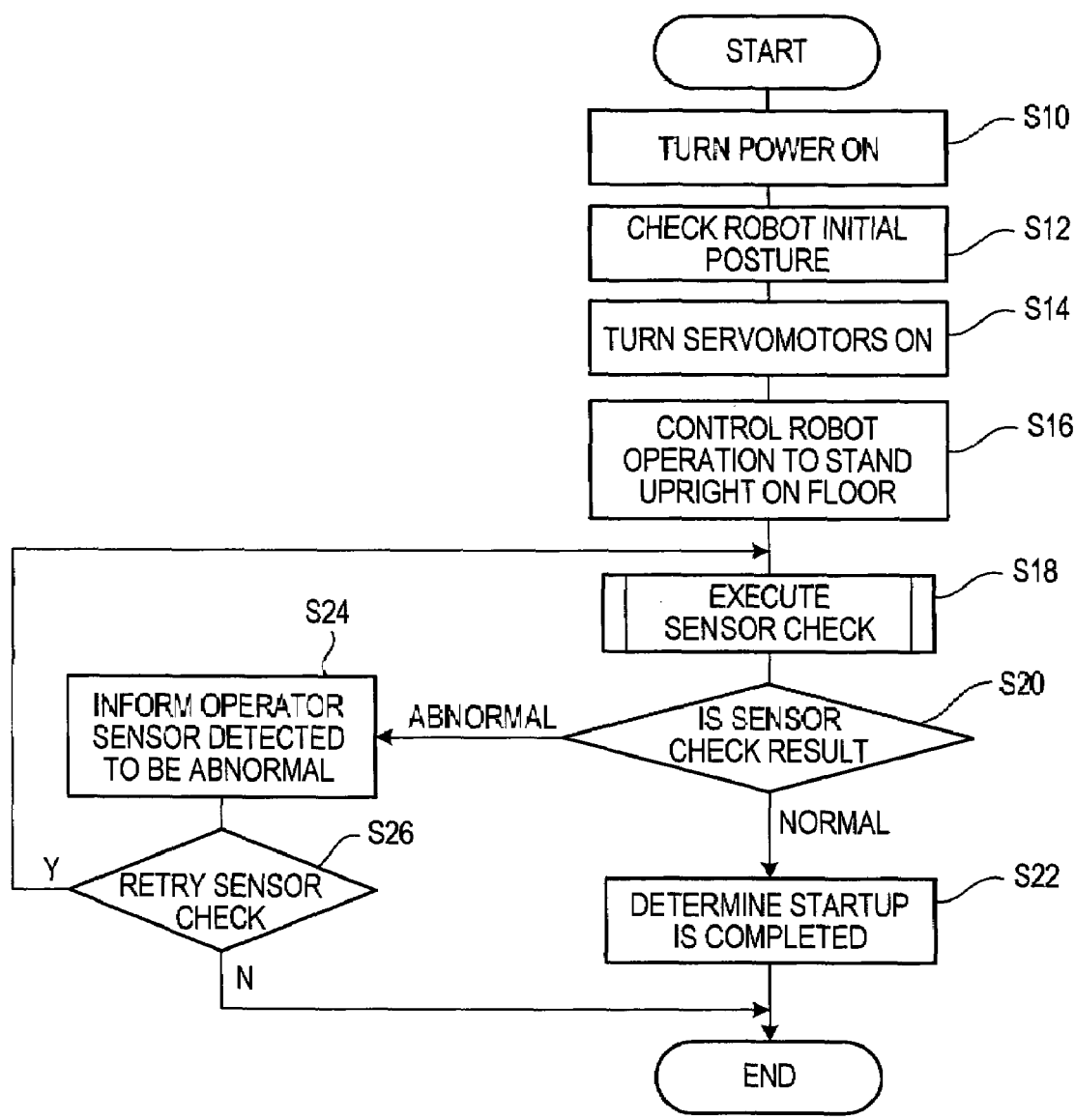
FIG. 6 is a flowchart showing the sequence of processes during startup of the robot, including detection operations, operated in the ECU.

FIG. 6 is a flowchart showing the sequence of processes during startup of robot 1, including the detection operations.

In S10 the power is powered on. Specifically, the power switch (not shown) is turned ON in response to a command inputted through the I/F 78a by the operator, thereby starting supply of power from the battery 76 installed in the housing unit 6 to the microcomputer of the ECU 70 and the like.

Next, in S12, the initial posture of the robot 1 is checked, whereafter, in S14, the servos are turned ON, i.e., the motor 10 and other servomotors are turned ON.

Next, in S16, the operation of the joints of the robot 1 is controlled to make the robot 1 stand upright (standstill) on the floor. This is achieved by the operations of the leg controller 70a1 explained with reference to FIG. 5.

Next, in S18, a sensor check is executed, i.e., abnormality detection (explained later) is carried out with respect to the force sensors 56. In addition to the force sensors 56 provided at the feet 22, the robot 1 is also equipped near the hands 40 with similar force sensors 58. In this embodiment, however, detection is carried out only with respect to left and right force sensors 56 installed at the left and right feet 22. The processes from S12 to S18 are also executed in response to commands inputted by the operator through the I/F 78a.

Next, in S20, the sensor check results are discriminated. When the force sensor 56 is detected to be "normal", the program proceeds to S22, in which startup is determined to be completed and walking control is commenced. On the other hand, when the force sensor 56 is detected to be "abnormal", the program proceeds to S24, in which the operator is informed through the wireless system 74 and operator ECU 78 that one or both force sensors 56 is detected to be abnormal.

Next, in S26, it is determined whether the sensor check is retried. When the result is YES, the program returns to S18, and when it is NO, the program is terminated forthwith, without passing through S22 that judges whether startup is completed, so that robot 1 walking is discontinued.

Figure 7:
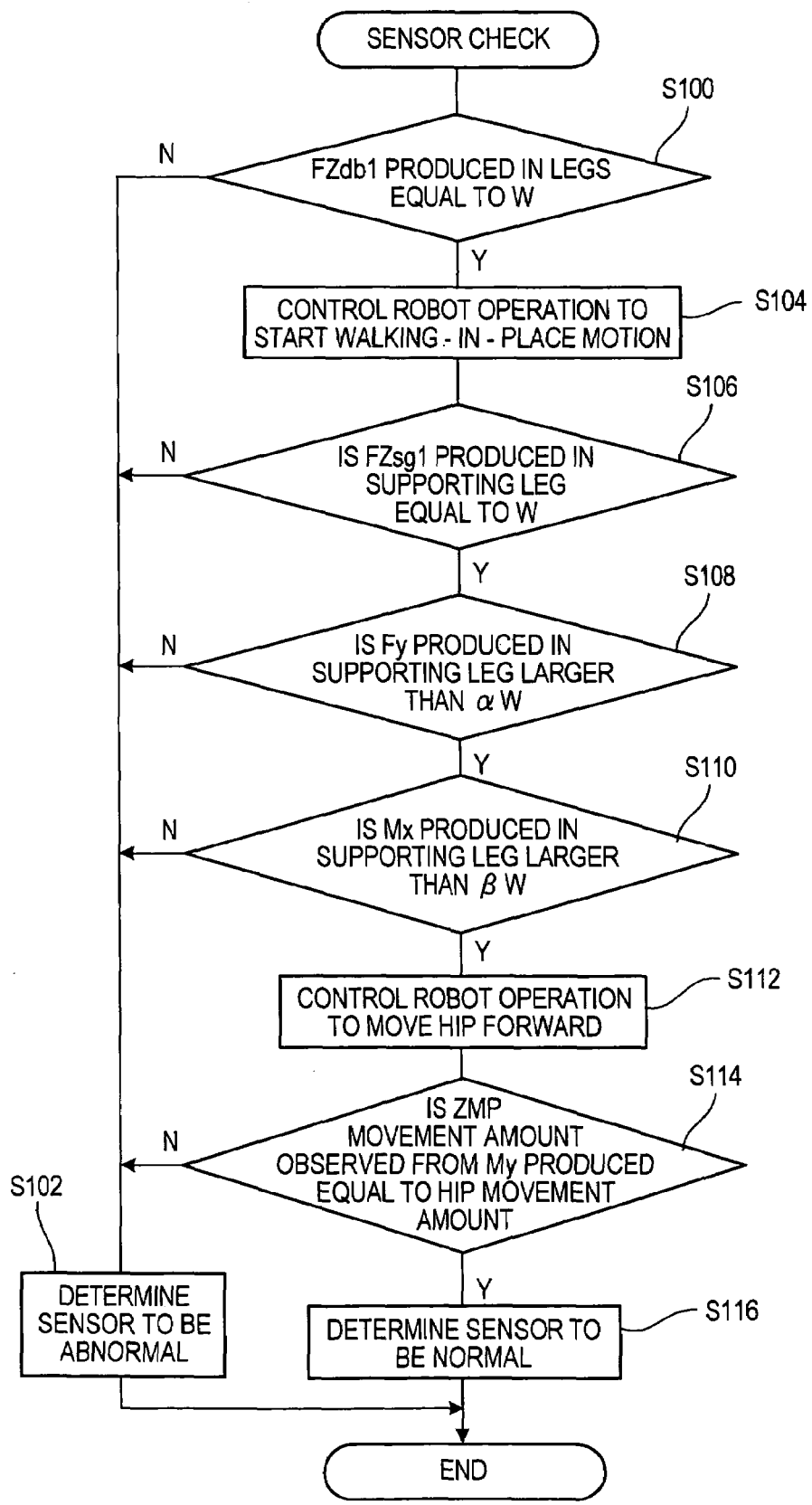
FIG. 7 is a subroutine flowchart showing the sequence of processes in sensor check (abnormality detection) in the flowchart of FIG. 6.

FIG. 7 is a subroutine flowchart showing the sequence of processes in the sensor check (abnormality detection) of S118 in FIG. 6.

First, in S100, the outputs of the two force sensors 56 associated with the feet 22 are read from the memory 70d and it is determined whether the force FZdb1 produced in both legs 2 is equal to a value W.

In the flowchart of FIG. 7, the following symbols have the following meanings. W: Weight of the robot 1 (52 kg). F: Force (load). M: Moment. α, β: Coefficients. As explained above, F and M are specific ones of the external forces acting on the robot 1, namely, floor reaction forces acting on the robot 1 from contact floor surfaces. The force F is composed of three directional components Fx. Fy and Fz. The moment (of force) M is composed of three directional components Mx, My and Mz. (These components are graphically defined in FIG. 3.)

The check made in S100 is done by summing the outputs of the two force sensors 56 and determining whether the obtained Z direction component FZdb1 falls between upper and lower limits suitably defined based on the dead weight W of the robot 1.

When the result in S100 is NO, the program proceeds to S102, in which it is determined or detected that both or at least one of the force sensors 56 is abnormal. This is because the value FZdb1 obtained from the two force sensors 56 should be a value near the dead weight W of the robot 1, since the robot 1 is controlled to rise (stand up) in S16 of FIG. 6, so that the only floor reaction force produced should be the Fz component.

When the result in S100 is YES, the program proceeds to S104, in which the operation of the robot 1 is controlled to make it start walking-in-place (stepping) motion. In other words, the operation of the robot 1 is controlled at startup to make it walk in place.

FIG. 8 is an explanatory view showing this operational control over time. As illustrated, the robot 1 is first made to stand upright, is next controlled to walk in place, and is then controlled to move or shift its hip (more precisely, hip position) fore and aft (more precisely forward) as explained further below. FIG. 9 shows these three types of operational control in greater detail. Since the processing operations of the flowchart of FIG. 7 are for checking the appropriateness of the outputs of the force sensors 56, the actual outputs of the force sensors 56 are not used for this control but provisional values prepared beforehand are used.

After the Fz component has been checked for both legs 2 in the standing condition, walking in place is continued for a period of three waling steps, and the Fx, Fy and Mx components are checked for each leg 2 during this time period. Next, the hip is moved or shifted forward by a predetermined amount, e.g., 30 mm, thereby moving or shifting the center of gravity of the robot 1 forward, and the My component is checked.

The hip (more precisely the hip position) is defined as a location at the lower center of the body 3 situated near the center of gravity located at or near a position immediately above crotch joints 10, 12, 14R(L). The walk-in-place motion is defined to include at least the motion of moving the two legs 2 of the standing robot 1 so as to make the legs alternately support the dead weight W.

The explanation of the flowchart of FIG. 7 will be resumed.

Next, in S106, it is determined whether FZsg1 produced in the single supporting leg is equal to the dead weight W of the robot 1. This is made by discriminating whether the Z direction force component FZsg1 obtained from the output of the force sensor 56 on the supporting leg side falls between upper and lower limits suitably defined based on the dead weight W (and the sole area of the foot 22 and the like) of the robot 1.

This check is carried out alternately for the left and right force sensors 56 during the walk-in-place motion continued for the period of three steps. When the result in S106 is NO, the program proceeds to S102, in which it is determined or detected that the force sensor 56 concerned is abnormal, for the same reason as when the result in S100 is NO.

When the result in S106 is YES, the program proceeds to S108, in which it is determined whether Fy occurring in the single supporting leg, specifically the Y direction force component Fy obtained from the output of the force sensor 56 on the supporting leg side, is larger than the product of the dead weight W of robot 1 and a coefficient $\alpha$. The coefficient $\alpha$ (as well as coefficient $\beta$ mentioned below) is a value empirically determined based on the force and moment that should occur in the force sensor 56 owing to hip acceleration during walking-in-place.

This check is also made alternately for the left and right force sensors 56. When the result in S108 is NO, the program proceeds to S102, in which it is determined or detected that the force sensor 56 concerned is abnormal. The reasoning behind the determination is that the horizontal swaying produced in the robot 1 in the roll direction (Y-axis direction) during walking in place gives rise to a force of a certain magnitude or greater in the same direction, so that when the result in S108 is that the force does not occur, the cause must be abnormality of the force sensor 56.

When the result in S108 is YES, the program proceeds to S110, in which it is determined whether Mx occurring in the single supporting leg, specifically the moment component Mx around the X axis obtained from the output of the force sensor 56 on the supporting leg side, is larger than the product of the dead weight W of the robot 1 and a coefficient $\beta$.

This check is also made alternately for the left and right force sensors 56. When the result in S110 is NO, the program proceeds to S102, in which it is determined or detected that the force sensor 56 concerned is abnormal. In other words, it is known that a moment of a certain magnitude or greater should be produced in the roll direction, so that when the result in S110 is that the moment is not produced, the cause must be abnormality of the force sensors 56.

When the result in S110 is YES, the program proceeds to S112, in which, as mentioned above, the operation of the robot 1 is controlled to move or shift the hip forward and thereby move the center of gravity forward.

Next, in S114, it is determined whether the amount of ZMP movement observed from the moment My produced is equal to the amount of movement of the hip. This determination is carried out by discriminating whether the amount of ZMP movement calculated using the Y-axis direction moment component My obtained from the outputs of the left and right force sensors 56 is within the range of appropriately set upper and lower limit values.

When the result in S114 is NO, the program proceeds to S102, in which it is determined or detected that one or both force sensors 56 is abnormal. As stated above, the ZMP means the point of action on the floor where the sum of the horizontal components of the moments of the resultant forces of the inertial forces produced by movement of the robot 1 and gravitational forces is zero. The hip movement should produce a moment around the Y axis and the ZMP should have been moved by a certain distance as a result. The fact that the output sensor value does not indicate this movement can be considered to mean that one or both of the force sensors 56 are abnormal.

When the result in S114 is YES, the program proceeds to S116, in which the force sensors 56 are determined or detected to be normal, the motion of the robot is controlled to restore the hip to the original upright state thereof, and the program is terminated.

At this point, as explained above, in the processes performed as shown by the flowchart of FIG. 6, if the result of the foregoing sensor check is "normal," startup is found to be completed and walking is commenced, and when it is "abnormal," walking is discontinued and the operator is informed that one or both force sensors 56 is found to be abnormal.

The embodiment is configured to have a system for detecting force sensor abnormality for a legged mobile robot (1) having a body (3), a plurality of legs (2) each connected to the body, a foot (22) connected to a distal end of each leg, and a force sensor (56) installed between the foot and the leg and producing an output indicative of floor reaction force acting from a floor on which the foot contacts, comprising: a robot motion controller (ECU 70, leg controller 70a1, S10 to S26, S104) controlling motion of the robot to perform a walking-in-place motion when the robot is powered on; a sensor output discriminator (ECU 70, sensor output discriminator 70b, S10 to S20, S100, S106 to S114) discriminating whether the output of the force sensor during the walk-in-place motion are within a predetermined range; and a sensor abnormality detector (ECU 70, leg controller 70a1, action planner 70c, S18, S102, S116) detecting abnormality of the sensor based on a result of the discrimination.

Thus when the robot 1 is started, it is made to perform a walk-in-place motion, a check is made as to whether the outputs of the force sensors 56 are within predetermined ranges at that time, and abnormality of the force sensors 56 is discriminated based on the discrimination result. In other words, the legged mobile robot 1 of this embodiment is configured to detect sensor abnormality by checking whether the various outputs of the force sensors 56 are within the associated predetermined ranges during the period that the robot is made to perform the walk-in-place motion (and hip movement). The discrimination period is thus prolonged so that it becomes very unlikely that a transient sensor output will continue to remain in the predetermined range throughout the discrimination period. Force sensor 56 abnormality can therefore be detected with high accuracy.

Moreover, the force sensors 56 are checked for abnormality when the robot 1 is performing the walk-in-place motion at startup, which means they are checked for abnormality before walking or other operation of the robot is initiated. This makes it easier to respond to detected abnormality (easier than when abnormality is detected in the course of walking) and the fact that the detection operation is performed can be visually confirmed from outside.

In the system, the walk-in-place motion is defined to include at least a motion of moving the legs 2 from standup so as to make the legs alternately support a weight W of the robot 1 (ECU 70, leg controller 70a1, S20, S106 to S110).

The fact that the walk-in-place motion includes at least the motion of moving the two legs 2 of the standing (upright) robot 1 so as to make them alternately support the dead weight W makes it possible to check whether the sensor outputs stay within the predetermined ranges when the posture of the robot 1 is varied to vary the floor reaction force, so that, in addition to the foregoing effects, it is further possible to detect sensor abnormality with still higher accuracy.

In the system, the force sensor 56 is a sensor that produces outputs indicating a force component (Fx, Fy, Fz) and a moment component (Mx, My, Mz) of the floor reaction force, and the predetermined range includes a plurality of predetermined ranges set corresponding to the force component and moment component.

The fact that the force sensors 56 are so configured to produce multiple outputs, including outputs indicating the force components Fx, Fy and Fz and moment components Mx, My and Mz of the floor reaction forces makes it possible not only to achieve the foregoing effects but further to detect abnormality of such sensors with still higher accuracy.

In the system, the predetermined ranges are set based on the weight W of the robot.

In the system, the sensor output discriminator discriminates whether at least one, more precisely four kinds of the outputs of the sensor 56 is within the predetermined range corresponding thereto (ECU 70, leg controller 70a1, action planner 70c, S20, S106 to S114).

The fact that the outputs that are required to be determined as to whether they fall within predetermined ranges are limited to at least some of the multiple outputs in this manner enables omission from the determination of sensor outputs that have little effect on the control, namely the sensor outputs Fx and Mz, so it is possible not only to achieve the foregoing effects but further to simplify the detection work while still achieving highly accurate abnormality detection with respect to the force sensors 56 capable of producing multiple outputs.

In the system, the sensor abnormality detector detects the sensor 56 to be abnormal when at least one of the outputs of the sensor is not within the predetermined range corresponding thereto (ECU 70, leg controller 70a1, action planner 70c, S20, S102).

Since the force sensors 56 are detected to be abnormal when at least some of their multiple outputs are not within the predetermined ranges, it is possible not only to achieve the foregoing effects but further to carry out discrimination using the sensor outputs as they are, whereby the detection work can be simplified while still achieving abnormality detection with respect to the force sensors capable of producing multiple outputs, rapidly and with high accuracy.

In the system, the sensor abnormality detector outputs a result of the detection when the force sensor is detected to be abnormal (ECU 70, leg controller 70a1, action planner 70c, S24).

When abnormality of the force sensors 56 is detected, the detection result is output, so that it is possible to achieve not only the foregoing effects but further to enable the sensor abnormality to be ascertained from the outside.

It should be noted in the above that, although a six-axis force sensor is given as an example of a force sensor in the foregoing description, this is not a limitation and it is alternatively possible to use any kind of force sensor capable of detecting floor reaction forces acting on the robot through the feet.

It should also be noted that, although the legged mobile robot is described as being a biped robot, this is not a limitation and the robot may be one having three or more legs.

Japanese Patent Application No. 2004-271615 filed on Sep. 17, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detecting force sensor abnormality for a legged mobile robot having a body, a plurality of legs each connected to the body, a foot connected to a distal end of each leg, and a force sensor installed between the foot and the leg and producing an output indicative of floor reaction force acting from a floor on which the foot contacts, comprising:
   a robot motion controller controlling motion of the robot to perform a walking-in-place motion when the robot is powered on;
   a sensor output discriminator discriminating whether the output of the force sensor during the walk-in-place motion are within a predetermined range; and
   a sensor abnormality detector detecting abnormality of the sensor based on a result of the discrimination.

2. The system according to claim 1, wherein the walk-in-place motion is defined to include at least a motion of moving the legs from standup so as to make the legs alternately support a weight of the robot.

3. The system according to claim 1, wherein the force sensor is a sensor that produces outputs indicating a force component and a moment component of the floor reaction force, and the predetermined range includes a plurality of predetermined ranges set corresponding to the force component and moment component.

4. The system according to claim 3, wherein the predetermined ranges are set based on the weight of the robot.

5. The system according to claim 3, wherein the sensor output discriminator discriminates whether at least one of the outputs of the sensor is within the predetermined range corresponding thereto.

6. The system according to claim 5, wherein the sensor abnormality detector detects the sensor to be abnormal when at least one of the outputs of the sensor is not within the predetermined range corresponding thereto.

7. The system according to claim 1, wherein the sensor abnormality detector outputs a result of the detection when the force sensor is detected to be abnormal.

8. A method of detecting force sensor abnormality for a legged mobile robot having a body, a plurality of legs each connected to the body, a foot connected to a distal end of each leg, and a force sensor installed between the foot and the leg and producing an output indicative of floor reaction force acting from a floor on which the foot contacts, comprising the steps of:

controlling motion of the robot to perform a walking-in-place motion when the robot is powered on;

discriminating whether the output of the force sensor during the walk-in-place motion are within a predetermined range; and detecting abnormality of the sensor based on a result of the discrimination.

9. The method according to claim 8, wherein the walk-in-place motion is defined to include at least a motion of moving the legs from standup so as to make the legs alternately support a weight of the robot.

10. The method according to claim 8, wherein the force sensor is a sensor that produces outputs indicating a force component and a moment component of the floor reaction force, and the predetermined range includes a plurality of predetermined ranges set corresponding to the force component and moment component.

11. The method according to claim 10, wherein the predetermined ranges are set based on the weight of the robot.

12. The method according to claim 10, wherein the step of sensor output discriminating discriminates whether at least one of the outputs of the sensor is within the predetermined range corresponding thereto.

13. The method according to claim 12, wherein the step of sensor abnormality detecting detects the sensor to be abnormal when at least one of the outputs of the sensor is not within the predetermined range corresponding thereto.

14. The method according to claim 8, further including the step of:

outputting a result of the detection when the force sensor is detected to be abnormal.

* * * * *